United States Patent
Lowe

(10) Patent No.: US 8,132,499 B2
(45) Date of Patent: Mar. 13, 2012

(54) HEATED SUBSTANCE RESERVOIR BAFFLE

(75) Inventor: Kevin Lowe, Virden, IL (US)

(73) Assignee: Bunn-O-Matic Corporation, Springfield, IL (US)

( * ) Notice: Subject to any disclaimer, the term of this patent is extended or adjusted under 35 U.S.C. 154(b) by 430 days.

(21) Appl. No.: 10/522,005

(22) PCT Filed: Jul. 15, 2003

(86) PCT No.: PCT/US03/22277
§ 371 (c)(1),
(2), (4) Date: Jan. 14, 2005

(87) PCT Pub. No.: WO2004/008019
PCT Pub. Date: Jan. 22, 2004

(65) Prior Publication Data
US 2005/0241487 A1    Nov. 3, 2005

Related U.S. Application Data

(60) Provisional application No. 60/395,939, filed on Jul. 15, 2002.

(51) Int. Cl.
*A47J 31/057* (2006.01)
*B67D 7/80* (2010.01)
*F24H 1/20* (2006.01)

(52) U.S. Cl. .............. 99/301; 99/300; 99/305; 392/452; 222/146.2

(58) Field of Classification Search .............. 99/300, 99/301, 306, 307, 283, 282, 281, 305, 299, 99/293; 222/146.2, 129.1; 392/452, 451, 449, 447, 441, 442
See application file for complete search history.

(56) References Cited

U.S. PATENT DOCUMENTS

| | | | | | |
|---|---|---|---|---|---|
| 3,987,716 | A | * | 10/1976 | Lorang | 99/279 |
| 4,252,254 | A | * | 2/1981 | Pryor | 222/67 |
| 4,413,552 | A | * | 11/1983 | Daugherty | 99/295 |
| 4,922,809 | A | | 5/1990 | Fuhner | |
| 5,083,504 | A | * | 1/1992 | Koga et al. | 99/302 R |
| 5,375,508 | A | * | 12/1994 | Knepler et al. | 99/280 |
| 6,003,435 | A | * | 12/1999 | Patel | 99/283 |
| 6,142,063 | A | * | 11/2000 | Beaulieu et al. | 99/283 |
| 6,360,650 | B1 | | 3/2002 | Mangiapane | |
| 6,612,224 | B2 | * | 9/2003 | Mercier et al. | 99/282 |

* cited by examiner

*Primary Examiner* — Reginald L Alexander
(74) *Attorney, Agent, or Firm* — Barnes & Thornburg LLP

(57) ABSTRACT

A heated water reservoir for use as a heated water dispenser, in conjunction with a beverage dispenser or for other uses. The heated water reservoir (5) includes a baffle (20) which communicates with an outlet port (7) positioned along the reservoir and an upper portion of the reservoir. In the reservoir a quantity of water is retained in a heated condition with an upper portion of the reservoir containing generally heated water of a higher temperature. An upper edge (35) of the baffle is positioned relative to the upper portion of the heated water reservoir such that passage of water from the reservoir into a cavity (22) defined, at least in part, by the baffle facilitates flow of water over the upper edge and into the outlet port. In this manner, water having a higher temperature is dispensed from the reservoir.

25 Claims, 6 Drawing Sheets

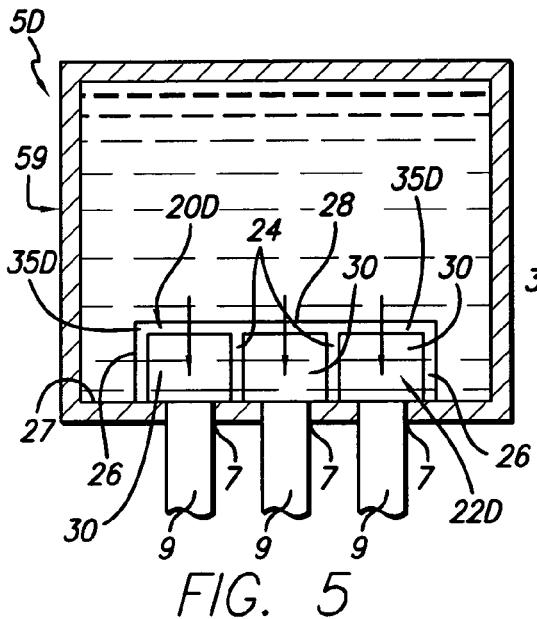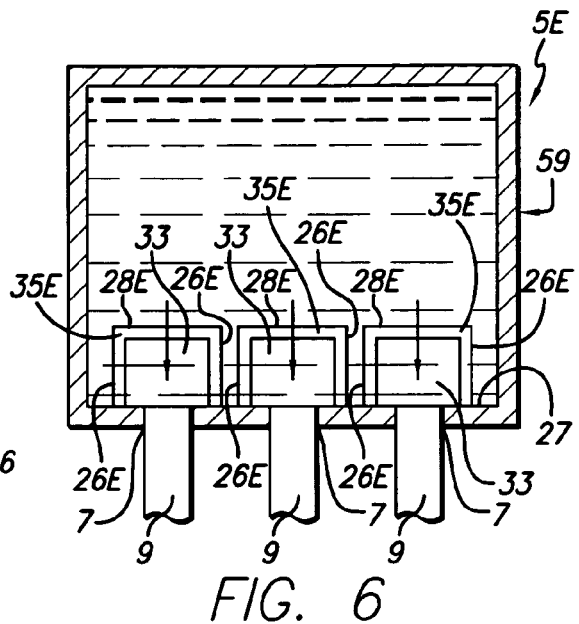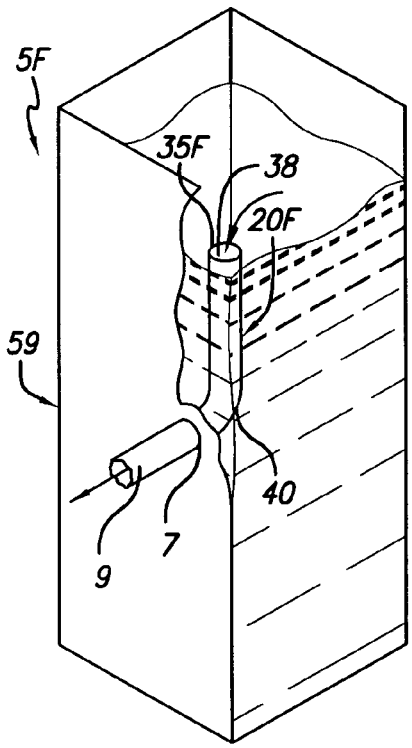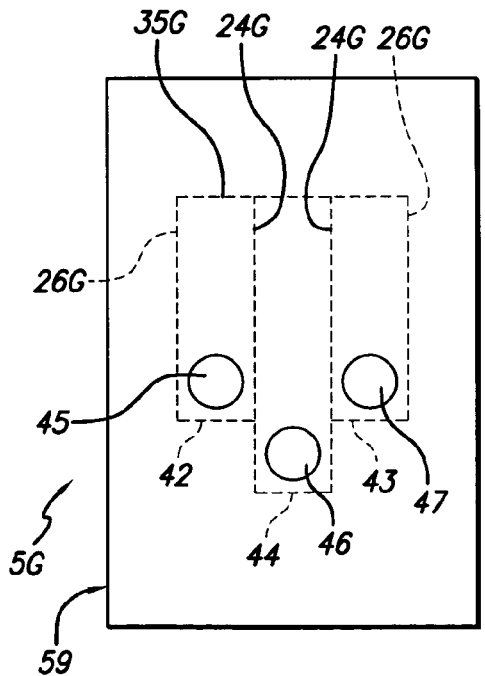

HEATED SUBSTANCE RESERVOIR BAFFLE

RELATED APPLICATIONS

This application is a U.S. Nationalization of PCT Application No. PCT/US03/22277, filed Feb. 14, 2003, which claims priority to U.S. Provisional Patent Application 60/395,939 filed Jul. 15, 2002. The prior applications are expressly incorporated herein by reference in their entirety.

BACKGROUND

The present disclosure relates to a heated substance reservoir having a baffle and method for delivering heated substance from such a reservoir.

The disclosure relates to a tank or reservoir for dispensing any liquid that one might desire to be heated and dispensed including but not limited to water, coffee, soup, or tea. In this disclosure, "substance" is intended to include such heated liquids for dispensing. For purposes of simplicity in this disclosure the "substance" will be referred to as water.

Generally, heated water dispensers operate by providing an inlet tube through which a water travels into a lower portion of a tank. A heating element is placed near the inlet tube and to heat the substance as the water comes into contact with the heating element. As the water is heated by the heating element, the heated water rises such that the hottest water is found generally in a top portion of the tank. The water is dispensed through an outlet generally located in an area from the top to the middle of the tank.

Water may be forced out of the outlet by the head pressure of the volume of water at a level above the height at which the outlet is located. Alternatively, incoming water pressure may pressurize the tank to a degree causing water to flow out of the outlet. One of the shortcomings of a tank, in which water is dispensed in the middle, is that the hottest water rises to the top of the tank, but it is the water in the middle portion of the tank that is dispensed first. The temperature of such "middle water" may be less predictable than the temperature of the substance at the top. The result with such tanks is that water may be dispensed at a less than optimal temperature, while leaving acceptable temperate water in the top of the tank.

This disclosure solves this and other problems by providing a baffle inside the tank for directing the heated water generally near the top area of the tank over a baffle to an outlet located generally spaced from the top portion of the tank, such as in the middle portion of the tank. As unheated water enters through the inlet and becomes heated, the heated water rises to the top portion and flows over a top edge of the baffle into a cavity connected or otherwise communicating with to the outlet.

Briefly, and in accordance with the foregoing, disclosed is a baffle for use in a heated substance reservoir or tank. The baffle defines a cavity which may be divided into one or more chambers for capturing, directing or channeling heated water as heated water flows over the edge of the baffle. This heated water, which rises to the top portion of the tank, is then dispensed first when an outlet positioned generally at the middle of the surface of the wall of the tank is opened.

Further, disclosed is one or more partitions or walls for dividing the cavity defined by the baffle and the wall of the tank into multiple chambers. These partitions or walls allow the tank to be fitted with multiple outlets in a staggered configuration which reduces the amount of space the outlets together are required to occupy on the surface of the tank. Such staggering may be useful in overcoming the problem of fitting the outlets in an area of limited space.

Additional features will become apparent to those skilled in the art upon consideration of the following detailed description of drawings illustrating of at least one embodiment of the disclosure. Additional features will become apparent to those skilled in the art upon consideration of the following detailed description of drawings.

BRIEF DESCRIPTION OF THE DRAWINGS

The detailed description particularly refers to the accompanying figures in which:

FIGS. 5 and 6 are two additional embodiments of the reservoir showing the baffle from a top view similar to that as shown in FIG. 4;

FIG. 7 is a simplified diagrammatic view of another embodiment of the heated reservoir;

FIG. 8 is a front view of the heated reservoir with interior components shown in broken line.

DETAILED DESCRIPTION OF THE DRAWINGS

Figure 1A:
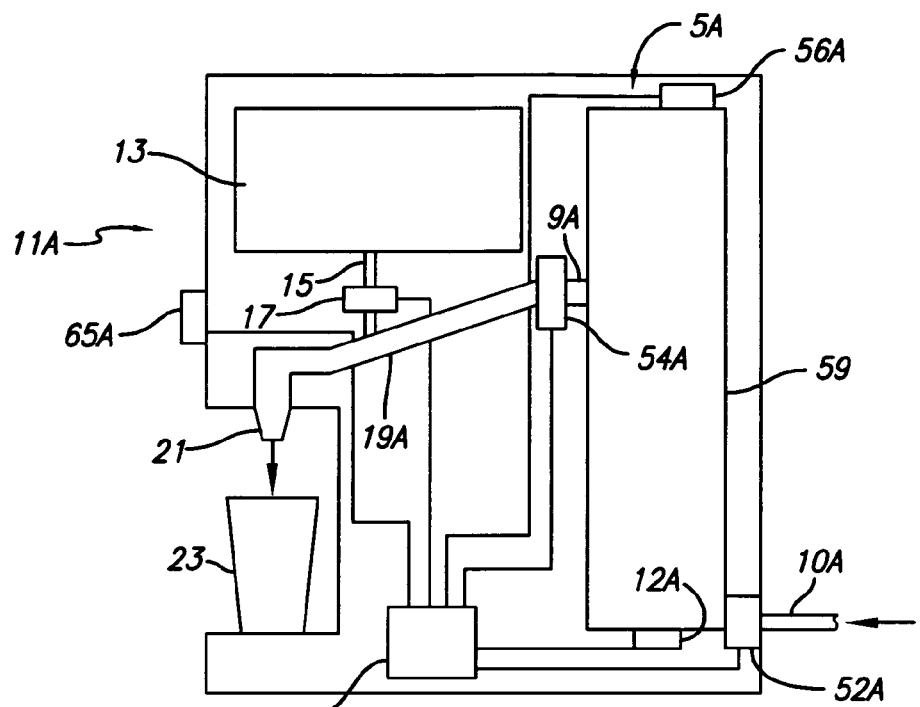
FIG. 1A is a simplified diagrammatic view of a heater reservoir as used in a beverage preparation device.

While the present disclosure may be susceptible to embodiment in different forms, there is shown in the drawings, and herein will be described in detail, embodiments with the understanding that the present description is to be considered an exemplification of the principles of the disclosure and is not intended to limit the disclosure to the details of construction and the arrangements of components set forth in the following description or illustrated in the drawings.

As shown in FIG. 1A, a beverage producing apparatus 11A includes a reservoir 5A which is used for heating water retained therein. The apparatus 11A includes a concentrate source 13 which has a dispensing line 15 communicating with a dispenser control 17 to dispense concentrate into a path 19 through which heated water is dispensed from the reservoir 5A. Concentrate and water are combined and dispensed through a nozzle 21 into a container or cup 23 positioned relative to the nozzle 21. The beverage producing apparatus 11A can be activated by a control switch 65a which coupled to the controller 50A. Also included on the beverage producing apparatus 11A is a level sensor 56A, an outlet control valve 54A and an inlet control valve 52A all of these components being connected to the controller 50A. Further description of these components is provided herein in greater detail.

Also provided on the beverage producing apparatus 11A is a heater 12A which is also described in greater detail herein below.

The definition of the beverage preparation device 11A should be broadly interpreted to include any device in addition to that as diagrammatically shown which might use heated water to produce a beverage. Terms including brewed, brewing, brewing substance, brewing liquid and brewed beverage as used herein are intended to be broadly defined as including but not limited to the brewing of coffee, tea and any other brewed beverage. This broad interpretation is also intended to include, but is not limited to any process of infusing, steeping, reconstituting, diluting, dissolving, saturating, or passing a liquid through or otherwise mixing or combining a beverage substance such as water without limitation to the temperature of such liquid unless specified. This broad interpretation is also intended to include, but is not limited to beverage substances such as ground coffee, tea, liquid beverage concentrate, powdered beverage concentrate, freeze dried coffee or other beverage concentrates, other food substances such as soups or food dishes, to obtain a desired beverage or food.

Figure 1B:
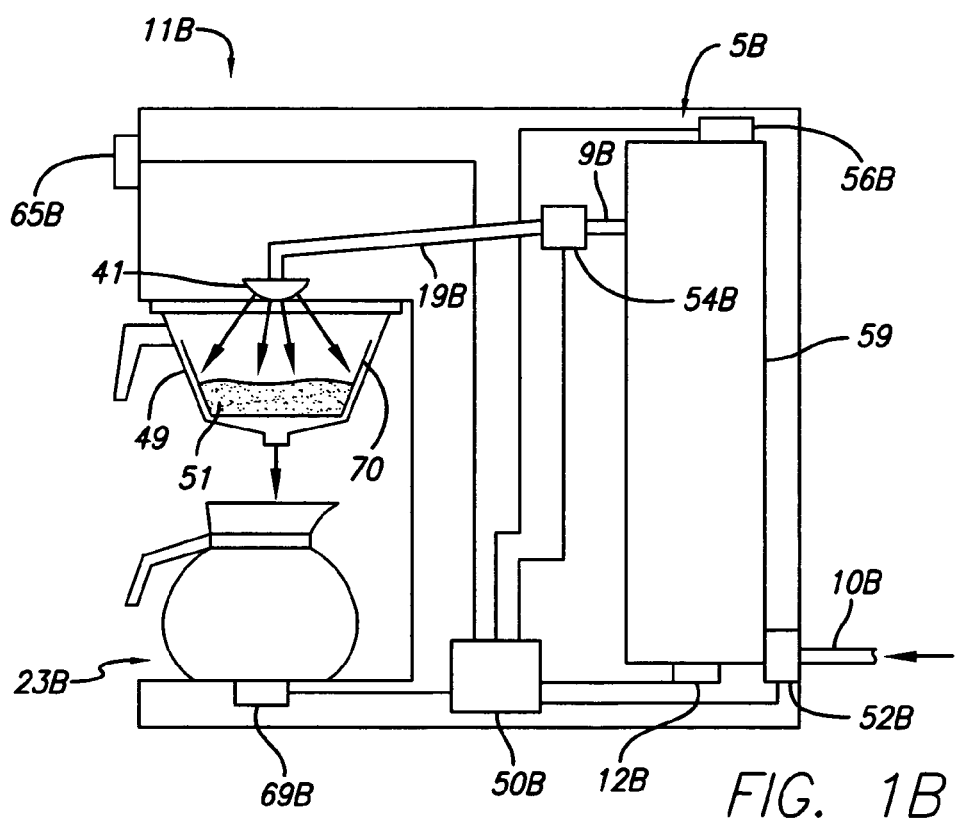
FIG. 1B is a simplified diagrammatic view of a heated reservoir in combination with a beverage brewing device in which the reservoir provides water to a brewing funnel.

A beverage brewer 11B as shown in FIG. 1B in which the reservoir 5B dispenses water through an outlet tube 9B to a sprayhead 41. The sprayhead 41 is positioned above a brewing funnel 49 of known construction for dispensing into a container or carafe 23B of known construction. While the beverage brewing apparatus 11B shown herein is shown in diagrammatic form, it is envisioned that other forms of brewing apparatus in which brewing water is dispensed from the reservoir 5B to brewing substance 51 retained in a filter 70 positioned in the funnel 49. The beverage producing apparatus 11B can be activated by a control switch 65B which is coupled to the controller 50B. Also provided on the beverage producing apparatus is a warming or heating element 69B, an outlet control valve 54B, an inlet control valve 52B and a level sensor 56B. All of these components are described in greater detail herein and are coupled to the controller 50B. Also provided is a heater 12B which, as described below, provides heat to the reservoir 5B. The heater 12B is coupled to the controller 50B.

Figure 1C:
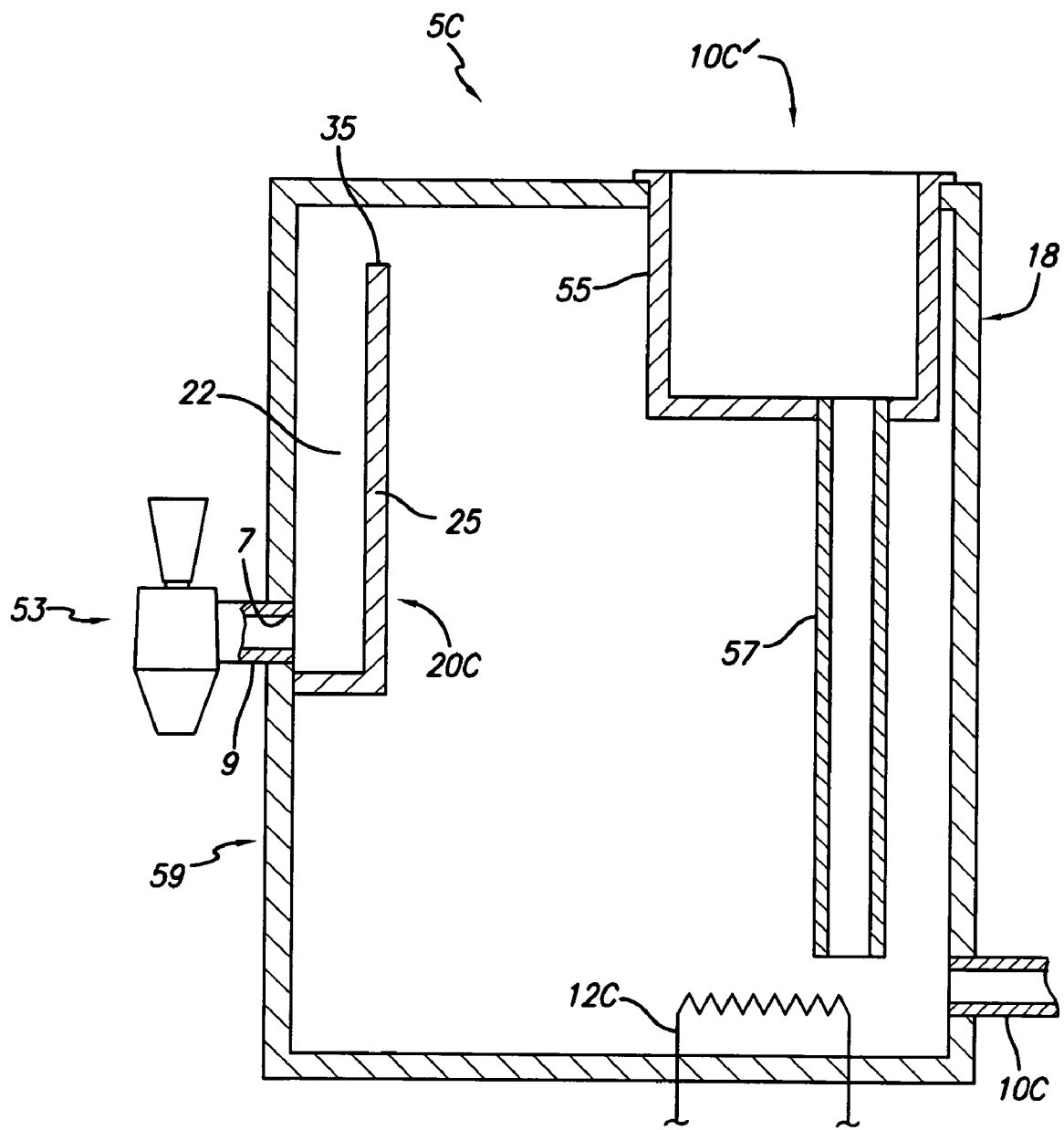
FIG. 1C is a simplified diagrammatic view of a heater water reservoir similar to those as shown in 1A and 1B and in which the heated water reservoir is not coupled to a beverage or food preparation apparatus but in which the heated water reservoir is used to dispense heated water through a dispensing faucet communicating with the outlet port of the reservoir.

FIG. 1C is a simplified diagrammatic view of a heated water reservoir 5C similar to that as shown in FIGS. 1A and 1B. Heated water reservoir 5C is designed to stand alone, in other words to provide heated water in a variety of ways such as producing beverages, heated foods or other uses for heated water. The reservoir 5C includes a baffle 20C communicating with the water in the reservoir 5C described herein above. The reservoir 5C includes a dispensing faucet 53 communicating with the outlet port 7 and corresponding tube 9. The dispensing faucet 53 provides controllable dispensing of heated water from the reservoir 5C using the teachings of the baffle as described throughout this specification.

Also reservoir 5C as shown in FIG. 1C includes an inlet port 10C' positioned in the lower portion 37 of the reservoir as well as an inlet port 10C' positioned in the upper portion 18 of the reservoir. In this regard, the inlet port 10C' may be used in combination with the inlet port 10C' or as a substitute for the inlet port 10C'. The upper inlet port is of the type referred to as a pour-in inlet port or pour-in basin. Such inlet port may also include a basin 55 and a tube 57. The dimension of the basin 55 and tube 57 are not shown to scale and are provided for purposes of description and illustration of additional embodiments herein. The basin 55 can be sized and dimensioned to hold a quantity of water for dispensing through the dispensing tube 57. The dispensing tube 57 is provided to place the unheated water poured through the inlet port 10C' into the basin 55 and thereby transported downwardly towards the lower portion 37 of the reservoir 5C so that it can be heated by the heating element 12. This helps to reduce the heat transfer of the unheated water poured into the basin 55 thereby reserving the heated water in the upper portion 18 for dispensing through the baffle 20C.

Figure 2:
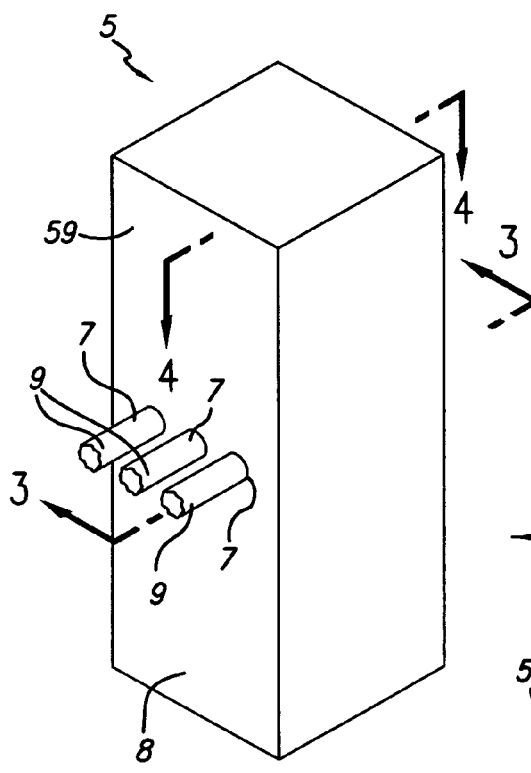
FIG. 2 is a simplified diagrammatic view of a heated water reservoir.

With reference to the figures, FIG. 2 generally shows and describes a simplified diagrammatic view of a heated water reservoir 5. The heated water reservoir 5, hereinafter referred to simply as the reservoir 5, is used to store, heat, and then dispense heated substance such as water. The reservoir 5 has a housing 59 defined by at least one wall. The housing 59 may be constructed from any suitable material for storing liquid including but not limited to metal, plastic, ceramic and glass. The housing 59 of reservoir 5 may also be constructed of or with a temperature insulating material such as a double walled metal, plastic, ceramic or glass container or any such container which has or further includes insulating material. One or more outlet ports 7 are located on the reservoir 5 shown in the illustrations as being located on the front portion 8 of the reservoir 8. Dispensing tubes 9 deliver water from the ports 7. The ports 7 are shown as openings in a front portion or wall 8 of the reservoir with the tubes 9 extending therefrom. Such connection may be in the form of a direct connection by which the tubes 9 are directly connected to the wall 8 or in which port fixtures are attached to the wall 8 and the tubes are attached to the port fixtures.

Figure 3:
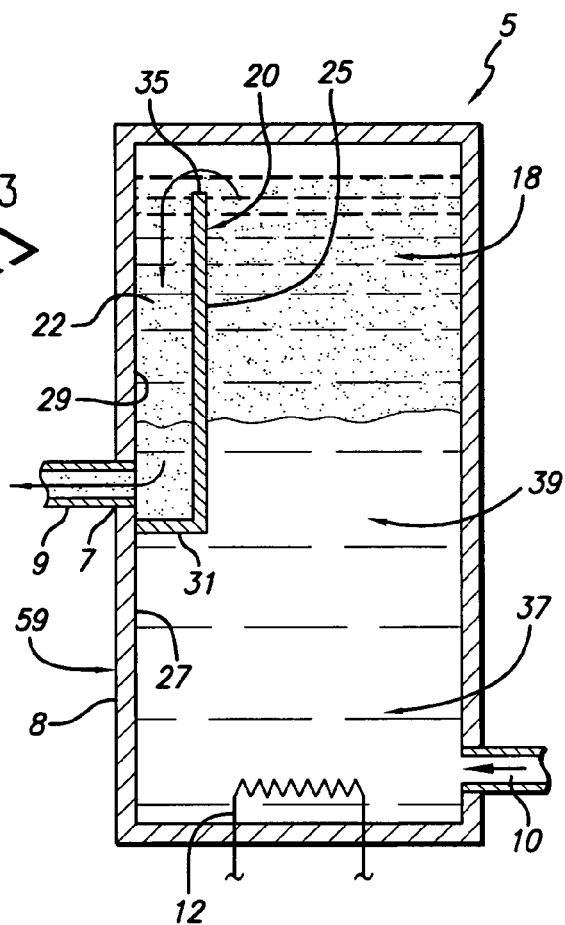
FIG. 3 is a simplified diagrammatic cross-sectional view thereof taken along line 3-3 in FIG. 2.

With reference to FIG. 3 in cross-section, water is directed into a lower portion 37 of the reservoir 5 via an inlet line 10. Water directed is delivered near a heating element 12. As the water is heated, the water rises on convection currents toward an upper or top portion 18 of the reservoir 5. Generally, the hottest water is found in the top portion 18 of this volume of water in the reservoir.

A baffle 20 is provided inside the reservoir 5 to direct water from the upper portion 18 of the reservoir towards an outlet port 7. The baffle 20 includes at least one wall 25 having an upper edge 35. The wall 25 is attached to an internal surface 27 of the reservoir 5. While the wall 25 of the baffle 20 is shown as being attached to the corresponding portion 29 of the reservoir 5, it is envisioned that a variety of ways of attaching the baffle 20 are included within the scope of this disclosure. For example, the baffle structure 20 can be attached by means of welding, adhesives, fastening such as by way of bolts, as well as directly forming the baffle into a surface of the reservoir such as by plastic molding. Generally, a cavity 22 is defined between the wall 25 and a corresponding inside surface 27 of a wall of the reservoir 5. A bottom 31 is shown on the baffle 20 illustrated in FIG. 3.

While the baffle 20 is shown in an embodiment in which the water is directed from the upper portion 18 of the reservoir 5 to a port 7 generally spaced in a middle portion 39 of the reservoir 5, it is envisioned that the ports could be located at any position along the reservoir 5 even towards the upper portion 18 as well as a lower portion 37. The location of the ports 7 generally in the middle portion 39 as shown for purposes of illustrating an embodiment of the disclosure. Ports 7 located in the upper portion 18 will also benefit from a baffle 20 to help direct the flow of the water in the upper portion 18 into the baffle and reduce, eliminate or otherwise prevent and/or control the dispensing of heated water in the upper portion 18 into the port 7.

FIGS. 5-9 show other embodiments of the baffle 20 including individual sub-divided chambers (FIG. 5), individually spaced apart baffles and chambers (FIG. 6), and one or more tubes defining the baffle and chamber (FIG. 8).

In use, all the different embodiments of the baffle 20 normally function in substantially the same general manner. For example, as the water is dispensed from the reservoir 5 through the tube 9, the hottest water in the upper portion 18 of the reservoir 5 generally flows over the top edge 35 of the baffle 20. The heated substance travels through the cavity 22 downwardly towards the outlet port 7 for dispensing through the tube 9. Multiple tubes 9 and multiple baffles 20 are shown for illustrative purposes, one or more such tubes may be used.

An example of a use of the reservoir 5 is in a brewing apparatus of generally known construction. When brewing cycle is started, one of the outlet tubes 9 is opened and the inlet line 10 is opened. As a result, water flows into the reservoir 5 generally simultaneously to refill the volume of water flowing out. In this example, water flows into the reservoir 5, is heated to a desired temperature, and dispensed to a spray head (see FIG. 1B, spray head 41) or for mixing with a concentrate 13 such as is shown in FIG. 1A. The mechanism described herein provides optimally heated water for these applications.

Figure 4:
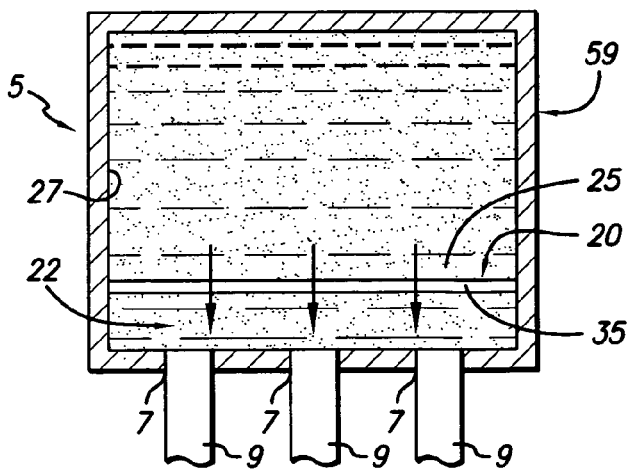
FIG. 4 is a simplified diagrammatic cross-sectional view taken along line 4-4 in FIG. 2.

FIG. 4 shows a top view of the reservoir 5. In this embodiment, the baffle 20 includes the wall 25 creating a shared cavity 22 out of which substance is directed to the outlet tubes 9. FIG. 5 shows another embodiment of the baffle 20D. In this embodiment, the baffle 20D includes a back wall 28, two exterior side walls 26 and two interior walls 24 which further divide the cavity 22D into a number of separated chambers 30. Water flowing over the top edge 35D of the walls 28, 26, 24 can be dispensed from one outlet tube 9 while storing heated water in the other non-dispensing chambers 30. Although FIG. 5 shows three chambers 30, any number of chambers 30 may be utilized depending on the desired number of outlet tubes 9. For each additional chamber 30, one additional interior wall 24 would be provided. Although this embodiment shows chambers 30 having square or rectangular cross-sections, these chambers 30 may be curved, triangular, square, or any other shape as may be needed or desired for a particular application.

In general, the volume of each chamber 30 can be sized and dimensioned to be compatible with the outlet tube 9. For example, if a chamber 30 is too small, the supply of water in that chamber 30 will be insufficient to dispense a desired amount of water from the outlet tube 9 resulting in a mismatched flow creating a "choked-off" effect.

FIG. 6 shows another embodiment in which the chambers 33 do not share an interior wall 28 with neighboring chambers 30. Instead, each chamber 33 is defined by its own back wall 28E and exterior walls 26E. This embodiment may be advantageous where the volume of substance to be retained in the chamber 33 is desired to be as small as possible. In this manner, a minimal amount of substance has time to cool before being dispensed.

FIG. 7 shows another embodiment in which the baffle 20F is tube-shaped. As in the previous embodiment, heated water rises inside the reservoir 5F and flows over the top edge 35F of the baffle 20F before it is directed to the dispensing tube 9. Positioning a tube shaped baffle 20F in this manner provides an even smaller volume of substance being stored in the cavity 38 defined by the baffle 20F tube wall 40 than in the individual chambers 33 of the previous embodiment providing for even tighter temperature control.

FIG. 8 shows a front view of another embodiment of the reservoir 5G with the interior components contained within the reservoir 5G walls shown in broken line. In this embodiment, the outlet tubes 45, 46, 47 are positioned in a staggered arrangement with the two end outlets tubes 45, 47 positioned higher than a central outlet tube 46. The exterior walls 26G extend downwardly to below the outlet tubes 45, 47 to bottom portions 42, 43. The interior walls 24G extend downwardly to just below the center outlet tube 44 to a bottom portion 44. This arrangement allows the outlet tubes 45, 46, 47 to be in closer proximity to occupy a minimal surface area on the front of the reservoir 5d while still providing for an optimal temperature for the substance. Although a 2-1 configuration is shown in this embodiment, other arrangements of the outlets tubes 45, 46, 47 may be used. Also, although three outlet tubes 45, 46, 47 are shown, a reservoir 5 may be fitted with more or less outlet tubes depending on the application. The quantity of outlet tubes and arrangement shown herein are not intended to limit other variations.

Figure 9:
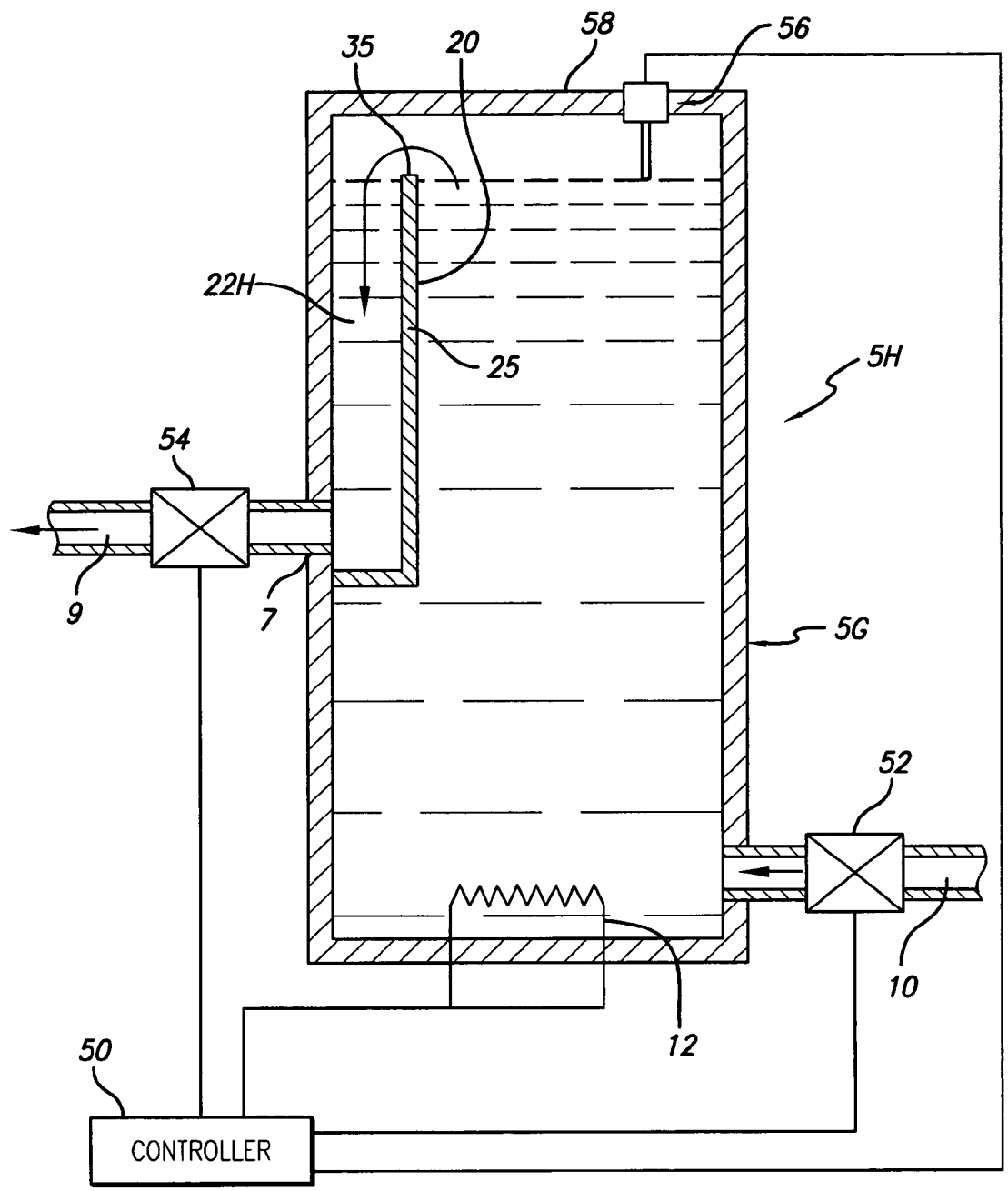
FIG. 9 is a simplified diagrammatic side cross-sectional view of a heated reservoir connected to a controller.
Figure 10:
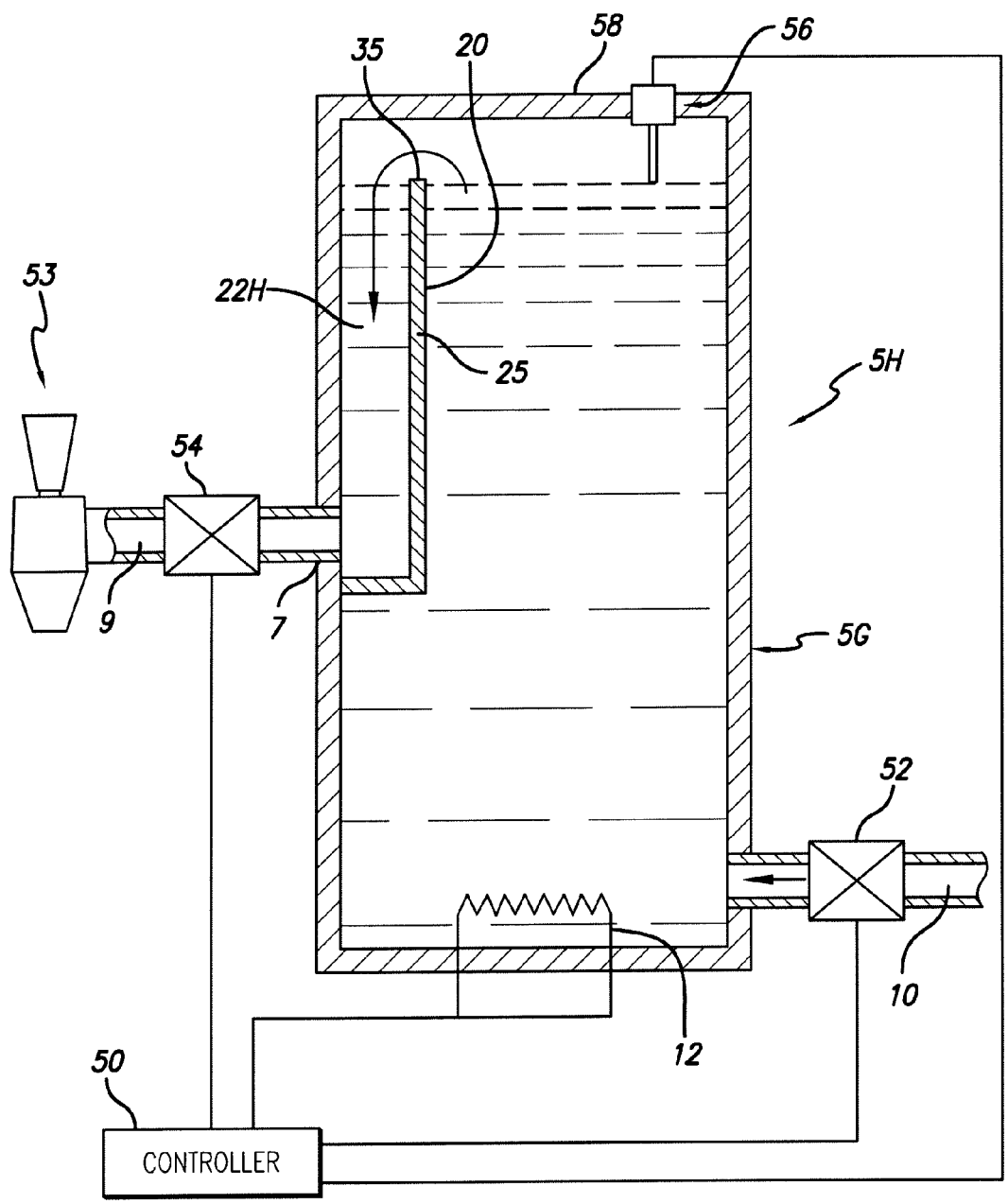
FIG. 10 is a simplified diagrammatic side cross-sectional view of a heated reservoir connected to a controller.

As shown in FIG. 9 and FIG. 10, to control the flow of water into the reservoir 5H, a controller 50 may be used to open and close a valve 52 positioned along the inlet tube 10. The valve 52 is operated by the controller 50 to allow water to flow therethrough during a predefined period based on a known flow rate to allow a desired volume of water into the reservoir 5H. When a sufficient volume of water has been directed into the reservoir 5H, and a desired volume fills the cavity 22H, the controller 50 controllably operates a valve 54 position along the outlet tube 9 to open to allow dispensing therefrom, which dispensing is controlled by faucet 53. Because the volume of substance entering the reservoir 5e will displace an equivalent volume already in the reservoir 5H, the exact quantity of optimally heated substance available to be dispensed is controlled by the controller 50 operating the valve 52.

A level sensor 56 generally known in the art and of known construction, may be coupled to the reservoir 5H such as at the top 58 as shown in FIG. 9. The level sensor 56 detects at least one level of substance in the reservoir 5e and communicates with the controller 50 to operate the valves 52, 54 to control the volume of substance inside the reservoir 5H and dispensing through the tube 9.

While embodiments of the disclosure are shown and described, it is envisioned that those skilled in the art may devise various modifications, combinations, partial combinations, and equivalents without departing from the spirit and scope of the disclosure are recited in the claims.

I claim:

1. In a beverage preparation apparatus using heated water for producing a beverage reservoir, a reservoir for containing and dispensing heated water comprising:
    a housing defining a chamber therein;
    a water heater associated with the housing and located in a lower portion of the chamber for heating the water in the chamber;
    at least one inlet port communicating with the chamber for introducing water into the lower portion of the chamber near the water heater;
    at least one baffle structure positioned inside the chamber against one inside surface of the chamber, the at least one baffle structure having a continuous wall and a bottom structure, without holes therethrough, at least partially defining a cavity with the inside surface of the chamber, the cavity communicating with the chamber;
    at least one outlet port extending through the housing proximate to and communicating directly with the lower portion of the cavity defined by the baffle structure for dispensing water flowing from the chamber to the cavity under force of gravity; and
    an upper edge of the wall defining a mouth providing the only access through which water is received from the chamber into the cavity for dispensing through the outlet port under force of gravity, wherein water must pass from the chamber through the mouth to flow to the cavity for dispensing from the outlet port directly through the wall of the housing proximate the lower portion of the cavity.

2. The beverage preparation apparatus using heated water for producing a beverage reservoir as in claim 1, further comprising:
a tube extending from the outlet port;
a receiver for receiving heated water from the tube and for receiving a beverage substance for mixing with the heated water for producing a beverage therefrom.

3. The beverage preparation apparatus of claim 2, further comprising:
the receiver being a brewing funnel for receiving a quantity of beverage brewing substance therein, the tube delivering heated water for infusing the beverage brewing substance for producing a brewed beverage.

4. The beverage preparation apparatus of claim 2, further comprising:
the receiver being a mixing chamber for receiving a quantity of beverage brewing substance therein, a beverage substance dispenser for dispensing a beverage substance to the mixing chamber for mixing the beverage substance with heated water in the mixing chamber for producing a beverage.

5. The beverage preparation apparatus of claim 2, further comprising:
an inlet control device communicating with the inlet line for controlling the introduction of water to the reservoir.

6. The beverage preparation apparatus of claim 5, further comprising:
a controller;
the inlet control device being a controllable valve coupled to the inlet line and coupled with the controller for controllably operating the inlet control valve to controllably introduce water to the reservoir.

7. The beverage preparation apparatus of claim 2, further comprising:
an outlet control device communicating with the outlet line for controlling the dispensing of water to the reservoir.

8. The beverage preparation apparatus of claim 7, further comprising: a controller; the outlet control device being a controllable valve coupled to the outlet line and coupled with the controller for controllably operating the outlet control valve to controllably dispense water from the reservoir.

9. A beverage preparation apparatus using heated water for producing a beverage, the beverage preparation apparatus comprising:
a reservoir for receiving, containing and heating water;
a housing of the reservoir defining a chamber therein;
a controller for controlling operation of the beverage preparation apparatus;
a water heater associated with the housing and located in a lower portion of the chamber for heating the water in the chamber, the water heater being coupled to the controller;
at least one inlet port communicating with the chamber for introducing water into the lower portion of the chamber near the water heater;
an inlet control device communicating with the inlet port and coupled to the controller for controlling the introduction of water to the reservoir;
at least one baffle structure positioned inside the chamber against one inside surface of the chamber, the at least one baffle structure having a continuous wall and bottom structure, without any holes therethrough, at least partially defining a cavity with the inside surface of the chamber;
at least one outlet port extending through the housing proximate to and communicating directly with the lower portion of the cavity defined by the baffle structure for dispensing water flowing from the chamber to the cavity under force of gravity;
an outlet control device communicating with the inlet line and coupled to the controller for controlling the dispensing of water from the reservoir;
a tube extending from the outlet port;
an upper edge of the wall defining a mouth providing the only access through which water is received from the chamber into the cavity for dispensing through the outlet port under force of gravity, wherein water must pass from the chamber through the mouth to flow to the cavity for dispensing from the outlet port directly through the wall of the housing proximate the lower portion of the cavity; and
a receiver for receiving heated water from the tube and for receiving a beverage substance for mixing with the heated water for producing a beverage there from.

10. The beverage preparation apparatus of claim 9, further comprising:
the receiver being a brewing funnel for receiving a quantity of beverage brewing substance therein, the tube delivering heated water for infusing the beverage brewing substance for producing a brewed beverage.

11. The beverage preparation apparatus of claim 9, further comprising:
the receiver being a mixing chamber for receiving a quantity of beverage brewing substance therein, a beverage substance dispenser for dispensing a beverage substance to the mixing chamber for mixing the beverage substance with heated water in the mixing chamber for producing a beverage.

12. The beverage preparation apparatus of claim 9, further comprising:
the inlet control device being a controllable valve coupled to the inlet line and coupled with the controller for controllably operating the inlet control valve to controllably introduce water to the reservoir.

13. The beverage preparation apparatus of claim 9, further comprising:
the outlet control device being a controllable valve coupled to the outlet line and coupled with the controller for controllably operating the outlet control valve to controllably dispense water from the reservoir.

14. The reservoir of claim 9 further comprising the wall of the baffle defining a generally tubular structure communicating with the chamber and with one corresponding outlet port.

15. The reservoir of claim 9 further comprising at least one inlet port being positioned in a lower portion of the reservoir.

16. The reservoir of claim 9 further comprising at least one inlet port being positioned in an upper portion of the reservoir.

17. The reservoir of claim 9 the heating means further comprising a heating element retained in the reservoir for heating water disposed therein.

18. The reservoir of claim 9 further comprising a dispensing faucet communicating with the outlet port.

19. A heated water dispensing apparatus comprising:
a reservoir for receiving, containing and heating water;
a housing of the reservoir defining a chamber therein;
a controller for controlling operation of the heated water dispensing apparatus;
a water heater associated with the housing and located in a lower portion of the chamber for heating the water in the chamber, the water heater being coupled to the controller;

at least one inlet port communicating with the chamber for introducing water via an inlet line into the lower portion of the chamber near the water heater;

an inlet control device communicating with the inlet line and coupled to the controller for controlling the introduction of water to the reservoir;

at least one baffle structure positioned inside the chamber against one inside surface of the chamber, the baffle structure having a continuous wall and bottom structure, without any holes therethrough, at least partially defining a cavity with the inside surface of the chamber at least one outlet port extending through the housing proximate to and communicating directly with the lower portion of the cavity defined by the baffle structure for dispensing water flowing from the chamber to the cavity, the at least one outlet port dispensing water from the chamber to the cavity under force of gravity;

an upper edge of the wall defining a mouth providing the only access through which water is received from the chamber into the cavity for dispensing through the at least one outlet port under force of gravity, wherein water must pass from the chamber through the mouth to flow to the cavity for dispensing from the at least one outlet port directly through the wall of the housing proximate the lower portion of the cavity;

an outlet control device communicating with the inlet line and coupled to the controller for controlling the dispensing of water from the reservoir; and a controllable dispensing faucet communicating with the outlet port for controllably dispensing heated water from the apparatus.

20. The beverage preparation apparatus of claim 19, further comprising:
the inlet control device being a controllable valve coupled to the inlet line and coupled with the controller for controllably operating the inlet control valve to controllably introduce water to the reservoir.

21. The beverage preparation apparatus of claim 19, further comprising:
the outlet control device being a controllable valve coupled to the outlet line and coupled with the controller for controllably operating the outlet control valve to controllably dispense water from the reservoir.

22. The reservoir of claim 19 further comprising the wall of the baffle defining a generally tubular structure communicating with the chamber and with at least one outlet port.

23. The reservoir of claim 19 further comprising at least one inlet port being positioned in a lower portion of the reservoir.

24. The reservoir of claim 19 further comprising at least one inlet port being positioned in an upper portion of the reservoir.

25. The reservoir of claim 19 the heating means further comprising a heating element retained in the reservoir for heating water disposed therein.

* * * * *